United States Patent Office 2,905,571
Patented Sept. 22, 1959

2,905,571

ACRYLIC SCREEN SETTLING SYSTEM

Peter Seats, Lake Hiawatha, and Leo V. Connolly, Jr., Rutherford, N.J., assignors to Thomas Electronics, Inc., Passaic, N.J., a corporation of New Jersey No Drawing. Application December 30, 1957
Serial No. 705,747

4 Claims. (Cl. 117—33.5)

This invention relates to a process for depositing luminescent material on a solid surface in order to form a luminescent screen. More particularly the invention relates to the production of a layer of luminescent material by settling materials from liquid suspensions wherein a suspension of the material to be settled is placed in a vessel containing a support and the material is allowed to settle through the liquid onto the support after which the supernatant liquid is decanted or siphoned off leaving a layer of the luminescent material on the support. The invention relates particularly but not exclusively to the formation of screens of luminescent material comprising a support with a layer of phosphors settled thereon, for example, the luminescent screens of cathode ray tubes, luminescent lamps or X-ray apparatus. In the case of cathode ray tubes, the vessel may be the envelope of the tube and the support may be the end or face of the tube.

According to one currently used method of forming such luminescent coatings, the surface upon which the screen is to be formed is covered with a colloidal silica gel and an aqueous dispersion of luminescent material is then distributed over this collodial silica gel and is allowed to settle therethrough to deposit upon the surface. The excess silica gel is then removed and the screen dried. Such a process is described in detail in United States patent to Tidik No. 2,451,590. It is to be noted that this process involves gelation or structuration and that if the colloidal gel is allowed to stand for an excess amount of time the gel becomes so viscous that it cannot be readily poured off.

Another currently used method of forming a luminescent screen involves the formation of a cushion liquid containing an electrolyte to which is added a phosphor mixed with a silicate which reacts with the electrolyte to form a flocculent silicate suspension through which the phosphors settle to form a uniform coat. The liquid is then decanted and the coating is dried with flocculent silicate and some unreacted silicate serving as an adhesive to hold the phosphor particles in place during the decanting and subsequent heating steps. This process is basically different from the colloidal silica gel process in that there is no structuration but rather a slow precipitation, coagulation or flocculation forming aggregates which separate from solution.

Silicate systems of the foregoing types have achieved widespread use since they produce stronger screens than the processes which were used theretofore. However, a major disadvantage with silicate processes is that the alkali silicates readily etch or stain glass thus creating internal neck and external face cleaning problems. A further disadvantage lies in the relatively high cost of the material, since it must be very carefully made in order to insure reproducible behavior.

In addition to the silicate processes certain aqueous non-silicate and some non-aqueous processes have been proposed. These do not enjoy any widespread use, however, due to inferior screen adhesion or other inferior screen properties or high cost. Non-aqueous systems such as those employed with special water-sensitive phosphors are also usually hazardous in addition to being very costly.

It is accordingly a primary object of the persent invention to provide an improved aqueous system process for depositing luminescent material on a solid surface to form a luminescent screen.

It is another object of the invention to provide an aqueous system screen settling process of the foregoing type utilizing as a binding agent the water insoluble reaction product resulting from the reaction between a polymeric organic compound dissolved in water and a precipitating agent.

It is another object of the invention to provide an aqueous sedimentation process in which a phosphor settles through an aqueous medium which contains in suspension a substantially water insoluble reaction product resulting from the reaction between a water soluble acrylic polymer and a solution of a metallic salt.

These and further objects and advantages of the invention will become more apparent upon reference to the following detailed description of the process and of the best mode of carrying it out.

According to the process of the invention, we have found that a very satisfactory luminescent screen may be formed both economically and quickly by dissolving a hydrophilic acrylic polymer in water, mixing this with the phosphor or other luminescent material to be formed into a screen, and then pouring this mixture into a cushion liquid on the surface to be coated. According to the invention, the cushion liquid is an electrolyte comprising a solution of one of the group II metals: magnesium, calcium, barium and strontium.

Acrylic polymers which have been found satisfactory are polyacrylic acid, polymethacrylic acid, and polyacrylamide. In order to obtain screens with good texture and adhesion, it is normally beneficial to add an alkali to the polymer solution before it is introduced into the Group II metal salt solution. Suitable alkalies are hydroxides of sodium, potassium, ammonium and lithium. Depending on the properties of the phosphor and the type of screen desired, the quantity of alkali added may be, for example, sufficient to convert polymethacrylic acid stoichiometrically to the ammonium salt, or it may be desirable, for example, to adjust the pH to 8.0, or to 10.5, regardless of stoichiometrical proportions. However, it is not essential to add alkalies to obtain adherent screens. For example, if polyacrylic acid solution is reacted with a soluble barium salt, an insoluble reaction product is formed which acts as a strong binder for phosphor screens. Furthermore, it is not essential, although it is preferable, to add the polymer solution to the Group II metal salt solution. The reverse procedure can also be followed and produce satisfactory screens.

In a specific example of the formation of a luminescent screen in a television tube, a 21 inch, 90° tube envelope was supported in a vertical position with the face plate down. 19.5 liters of water having 40 grams of magnesium sulfate dissolved therein was poured in to a form a so-called cushion liquid. Over this cushion liquid was then added through a funnel with a rose outlet a solution formed in the following manner: 150 milliliters of 1% (w./w.) polyacrylic acid was titrated with normal sodium hydroxide to a pH of 10.0, and then an additional 1.5 milliliters normal sodium hydroxide was added. The resulting solution was diluted to a total volume of 500 milliliters with deionized water and six grams of a $P_4$ type phosphor consisting of zinc sulfide and zinc beryllium silicate added. The tube was allowed to stand for 15 to 20 minutes and the water then decanted out of the tube leaving the phosphor layer in place on the tube face plate. The resulting screen was then dried with a current of air and formed a tenaciously adherent coating.

From the foregoing example, it will be seen that screens formed according to the method of the invention may be produced in a relatively short period of time from low cost chemicals. The phosphors in the screen are held strongly in place by the reaction product and there is no tendency to glass etching.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of forming a luminescent screen on a solid surface comprising the steps of settling a luminescent material through the insoluble reaction product of a water soluble acrylic polymer selected from the group consisting of polyacrylic acid, polymethacrylic acid and polyacrylamide and an electrolyte consisting of a solution of a salt of a metal selected from the group consisting of magnesium, calcium, barium and strontium, and removing excess liquid from said surface.

2. A method of forming a luminescent screen on a solid surface which comprises forming on said solid surface an admixture of an electrolyte comprising a solution of a salt of a group II metal and water solution of an acrylic polymer selected from the group consisting of polyacrylic acid, polymethacrylic acid and polyacrylamide, settling through said admixture a luminescent material, said admixture producing a precipitation of an insoluble product on said solid surface to bind said luminescent material to said surface, and removing excess liquid from said surface.

3. A method of forming a luminescent screen on a solid surface which comprises forming on said solid surface an admixture of an electrolyte comprising a solution of a salt of a group II metal, a hydroxide of an element selected from the group consisting of sodium, potassium, ammonium and lithium and a water solution of an acrylic polymer selected from the group consisting of polyacrylic acid, polymethacrylic acid and polyacrylamide, settling through said admixture a luminescent material, said admixture producing a precipitation of an insoluble product on said solid surface to bind said luminescent material to said surface, and removing excess liquid from said surface.

4. A method of forming a luminescent screen on a solid surface which comprises forming on said solid surface an admixture of an electrolyte comprising a solution of a salt of a metal selected from the group consisting of magnesium, calcium, barium and strontium, a hydroxide of an element selected from the group consisting of sodium, potassium, ammonium and lithium and a water solution of an acrylic polymer selected from the group consisting of polyacrylic acid, polymethacrylic acid and polyacrylamide, settling through said admixture a luminescent material, said admixture producing a precipitation of an insoluble product on said solid surface to bind said luminescent material to said surface, and removing excess liquid from said surface.

References Cited in the file of this patent
UNITED STATES PATENTS

| | | |
|---|---|---|
| 2,621,134 | Welch | Dec. 9, 1952 |
| 2,689,830 | Sadowsky et al. | Sept. 21, 1954 |